US010368552B2

(12) United States Patent
Cheek et al.

(10) Patent No.: US 10,368,552 B2
(45) Date of Patent: Aug. 6, 2019

(54) METHOD FOR HUMANELY STUNNING AND SLAUGHTERING ANIMALS USING LOW ATMOSPHERIC PRESSURE AND INERT GAS

(71) Applicants: Hollis Cheek, Kosciusko, MS (US); Bruno Cattaruzzi, Brescia (IT)

(72) Inventors: Hollis Cheek, Kosciusko, MS (US); Bruno Cattaruzzi, Brescia (IT)

( * ) Notice: Subject to any disclaimer, the term of this patent is extended or adjusted under 35 U.S.C. 154(b) by 348 days.

(21) Appl. No.: 15/502,408

(22) PCT Filed: Aug. 7, 2015

(86) PCT No.: PCT/US2015/044287
§ 371 (c)(1),
(2) Date: Feb. 7, 2017

(87) PCT Pub. No.: WO2016/022959
PCT Pub. Date: Feb. 11, 2016

(65) Prior Publication Data
US 2017/0231237 A1  Aug. 17, 2017

Related U.S. Application Data

(60) Provisional application No. 62/034,557, filed on Aug. 7, 2014.

(30) Foreign Application Priority Data

Jun. 22, 2015 (IT) .......................... 102015000026115

(51) Int. Cl.
*A22B 3/00* (2006.01)
*A22B 3/08* (2006.01)
(52) U.S. Cl.
CPC .............. *A22B 3/005* (2013.01); *A22B 3/086* (2013.01)

(58) Field of Classification Search
CPC ................................. A22B 3/00; A22B 3/005
(Continued)

(56) References Cited

U.S. PATENT DOCUMENTS 2,526,037 A   10/1950  Murphy
2,588,770 A   3/1952   Sadler
(Continued)

FOREIGN PATENT DOCUMENTS

EP   1609365 A2    12/2005
WO   2014037015 A1  3/2014
WO   2016207780 A1  12/2016

OTHER PUBLICATIONS

"Council Regulation (EC) No. 1099/2009 of Sep. 24, 2009 on the protection of animals at the time of killing", Official Journal of the European Union, Sep. 24, 2009, pp. L303/1 to L303/30 (2009). Downloaded from http://eur-lex.europa.eu/LexUriServ/LexUriServ.do?uri=OJ:L:2009:303:0001:0030:EN:PDF.
(Continued)

*Primary Examiner* — Richard T Price, Jr.
(74) *Attorney, Agent, or Firm* — Armstrong Teasdale LLP

(57) ABSTRACT

The present disclosure generally relates to a method for humanely slaughtering animals, and more particularly to a method for slaughtering animals using a low atmospheric pressure system with or without the addition of inert gas. In particular, the animals are placed into a chamber, the chamber is sealed, and the pressure in the chamber is reduced along a predetermined pressure curve to a target decompression pressure, and maintained at the decompression pressure for a period of time until the animal achieves a state of death. The low atmospheric pressure slaughter is more humane than traditional slaughter techniques, and results in excellent meat quality.

19 Claims, 3 Drawing Sheets

(58) Field of Classification Search
USPC .............................................. 452/52, 57, 66
See application file for complete search history.

(56) References Cited

U.S. PATENT DOCUMENTS

| | | | |
|---|---|---|---|
| 3,548,447 A | 12/1970 | Price, Jr. | |
| 4,829,635 A * | 5/1989 | Tonnies | A22B 3/00 128/202.12 |
| 6,135,872 A * | 10/2000 | Freeland | A01K 45/005 452/57 |
| 6,848,987 B2 | 2/2005 | Draft | |
| 7,097,552 B2 * | 8/2006 | Ovesen | A22B 3/00 452/53 |
| 7,331,848 B2 * | 2/2008 | Zachariassen | A22B 3/00 452/66 |
| 7,435,166 B2 | 10/2008 | Benson | |
| 7,662,030 B2 * | 2/2010 | Cheek | A22B 3/086 452/57 |
| 7,771,255 B2 | 8/2010 | Cattaruzzi | |
| 7,794,310 B2 * | 9/2010 | Lang | A22B 1/00 452/57 |
| 8,113,926 B1 * | 2/2012 | Cheek | A22B 3/00 452/66 |
| 8,267,080 B2 | 9/2012 | Sundberg | |
| 8,272,926 B2 * | 9/2012 | Lang | A22B 3/086 452/57 |
| 8,323,080 B2 | 12/2012 | Lang et al. | |
| 8,591,297 B2 * | 11/2013 | Lang | A22B 1/00 452/66 |
| 2005/0095969 A1 | 5/2005 | Mosher | |
| 2006/0009142 A1 | 1/2006 | Cattaruzzi | |
| 2006/0086038 A1 | 4/2006 | Mosher | |
| 2008/0302309 A1 | 12/2008 | Herman | |
| 2009/0126647 A1 | 5/2009 | Anderson et al. | |

OTHER PUBLICATIONS

International Search Report and Written Opinion issued for PCT/US2015/044287 dated May 20, 2016.
International Search Report and Written Opinion issued for PCT/IB2016/053667 dated Sep. 22, 2016.

* cited by examiner

METHOD FOR HUMANELY STUNNING AND SLAUGHTERING ANIMALS USING LOW ATMOSPHERIC PRESSURE AND INERT GAS

CROSS-REFERENCE TO RELATED APPLICATIONS

This application is a U.S. National Phase patent application of International Application Serial No. PCT/US2015/044287, filed on Aug. 7, 2015, which is hereby incorporated by reference in its entirety, and which claims the benefit of U.S. Provisional Application Ser. No. 62/034,557, filed on Aug. 7, 2014, and Italian Patent Application No. 102015000026115, filed on Jun. 22, 2015, which are both incorporated by reference herein in their entirety.

BACKGROUND OF THE DISCLOSURE

The present disclosure generally relates to methods for humanely stunning and/or slaughtering diaphragm respiratory system animals, such as pigs, sheep, rabbits, cows, and non-diaphragm animals such as poultry (e.g., chicken and quail). More specifically, the present disclosure is directed to a method for slaughtering diaphragm respiratory system animals, such as pigs, using a low atmospheric pressure system with or without the addition of inert gas. In particular, the animals are placed into a chamber, the chamber is sealed, and the pressure in the chamber is reduced along a predetermined pressure curve to a target decompression pressure, and maintained at the decompression pressure for a period of time until the animal achieves a state of death. Also disclosed are methods for humanely slaughtering animals, including poultry or non-poultry animals, using low atmospheric pressure in combination with an inert gas. The methods of the present disclosure are more humane than traditional slaughter techniques, and results in excellent meat quality.

In the meat-processing industry, animals such as pigs and poultry are processed in slaughterhouses into products intended for human consumption. Before the animals can be processed, they must first be stunned and then killed. In order to achieve a humane slaughter, the stunning should be sufficient to render the animal unconscious, so the animal does not experience fear, pain, distress, and/or unnecessary suffering during the slaughter process. The animal should be sufficiently stunned so the animal is immobile, does not regain consciousness during slaughter, and does not struggle to free itself during further processing.

The slaughter of animals such as pigs and poultry has traditionally been achieved, for example, by mechanical stunning (e.g., the captive bolt system), electrical stunning, or gas stunning prior to slaughter. The captive bolt system works on the principle of a gun, by firing a blank cartridge that propels a short metal rod from the barrel. The bolt penetrates the skull bone, causing bruising of the brain, stunning the animal. The position and direction of the shot, appropriate velocity, shape of the bolt, and strength of the cartridge are all critical parameters for a successful stun. Electrical stunning involves exposing the animals to an electric voltage. For example, a low voltage alternating electric current may be applied to the animal by means of two electrodes, which are placed on either side of the brain using tongs. Electrical stunning induces electropletic shock or an epileptic state of the brain. The minimum current, minimum voltage, minimum frequency, frequency of calibration of the equipment, and position and contact location on the animal are all critical parameters to a successful electrical stun. Gas stunning, which is a relatively new technique, typically involves the introduction of gases, such as carbon dioxide plus other inert gases, including argon and nitrogen, into a closed chamber containing the animal.

There are drawbacks associated with each of these known stunning techniques. For instance, it is important that an animal has become insensible after stunning. Poor maintenance of the captive bolt method is a major cause of poor stunning. Both captive bolt and electrical stunning can result in manpower fatigue, which may cause wrongful placement of the devices. Failure of the operator to apply the apparatus to the correct spot may not produce unconsciousness. Similarly, gas stunning requires precise concentration and time to achieve a successful stunning, and does not always achieve sufficient stunning to prevent the animal from regaining consciousness during bleeding. The cost of the gas used in the gas stunning can also add to the overall cost of the slaughter.

Attempts have also been made to stun or slaughter animals using changes in pressure. For example, U.S. Pat. No. 4,829,635 to Tonnies discloses a method for stunning animals, such as pigs, before slaughter using a two-step pressure drop. The animal is enclosed in a chamber that is first evacuated to an intermediate pressure (e.g., 150 mbar) that is well below atmospheric pressure (e.g., 1030 mbar), until the animal loses consciousness but not reflexes. The chamber is then evacuated again to a low pressure (e.g., 30 mbar) well below the intermediate pressure, and the low pressure is maintained until the animal is without reflexes, but heart function remains. Each step is disclosed as taking less than 5 seconds. The chamber is subsequently substantially instantaneously recompressed, causing a supplementary stun effect. One disadvantage to the process disclosed in the Tonnies patent, is that it achieves a stun that results in the continuance of heart function of the animal. If the animal is not immediately slaughtered following stunning, the animal could recover consciousness, which would cause undue stress to the animal. High levels of stress in an animal can reduce the quality of the meat. Additionally, each step in the Tonnies patent is disclosed as taking less than 5 seconds, which is considered to be rapid decompression. Rapid decompression is considered inhumane by groups such as the American Veterinary Medical Association. The Tonnies patent does not provide any details about the chamber used in the stunning.

U.S. Pat. No. 2,588,770 to Sadler discloses an apparatus and method for stunning or killing animals. The process involves a pressure drop, first to a pressure low enough to cause sleepiness or unconsciousness, and then optionally to a lower air pressure which is sufficient to kill. In particular, the apparatus comprises a chamber connected to one or more ballast tank(s), an air pump, and a motor. The air pump is powered by the motor, and draws a vacuum on the ballast tank(s). Upon achieving a vacuum, a valve is opened between the ballast tank(s) and the chamber containing an animal. The opening of the valve causes a sudden equalization of atmospheric pressure in the animal chamber, thus subjecting the animal to low pressure, which causes animal unconsciousness. Suitable pressures for rendering the animal unconscious or for killing the animal are not disclosed. One disadvantage to the stunning method disclosed in the Sadler patent is that the rapid decompression and return to ambient pressure can cause stress to the animal, ear drum damage, and internal organ and tissue damage.

In view of the drawbacks associated with prior stunning and slaughter methods, there is a need for a more humane method of stunning and slaughtering animals, and in particular pigs, that also results in an excellent meat quality.

SUMMARY OF THE DISCLOSURE

The present disclosure generally relates to a method for humanely stunning and/or slaughtering diaphragm respiratory system animals, such as pigs, and more particularly to a method for slaughtering pigs using a low atmospheric pressure system with or without the addition of an inert gas. In particular, at least one animal is placed into a chamber, the chamber is sealed, and the pressure in the chamber is reduced at a continuous rate to a target decompression pressure and maintained at the decompression pressure until a state of death is obtained. The low atmospheric pressure slaughter described herein is more humane than traditional slaughter techniques, and results in excellent meat quality.

In particular, the present disclosure is directed to a method for humanely slaughtering a non-poultry animal having a diaphragm respiratory system, the method comprising: placing the animal in a chamber; sealing the chamber; decompressing the chamber at a continuous rate to a decompression pressure, the decompression pressure being lower than a normal atmospheric pressure at which the animal is accustomed to living; and maintaining the decompression pressure until the animal achieves a state of death; wherein pressure in the chamber is reduced to the decompression pressure over a lapse time of between about 4 minutes and about 8 minutes. The animal may be, for example, a pig, sheep, a rabbit, a cow, a goat, a llama, a vicuna, an alpaca, and/or a horse.

In another embodiment, the present disclosure is directed to a method for humanely slaughtering a non-poultry animal having a diaphragm respiratory system, the method comprising: placing the animal in a chamber; sealing the chamber; decompressing the chamber at a continuous rate to a decompression pressure of from about 21 inHg to about 24 inHg gauge pressure; and maintaining the decompression pressure for at least about 4 minutes. The animal may be, for example, a pig, sheep, a rabbit, a cow, a goat, a llama, a vicuna, an alpaca, and/or a horse.

The present disclosure is also directed to a method for humanely slaughtering an animal, the method comprising: placing the animal in a chamber; sealing the chamber; decompressing the chamber to a decompression pressure, the decompression pressure being lower than a normal atmospheric pressure at which the animal is accustomed to living; adding an inert gas to the chamber after the decompression pressure has been reached; and maintaining the decompression pressure until the animal achieves a state of death. The animal may be, for example, a pig, sheep, a rabbit, a cow, a goat, a llama, a vicuna, an alpaca, a horse, and/or poultry.

The present disclosure is also directed to a system for the stunning and/or the slaughtering of meat animals, comprising an airtight chamber provided with at least one opening for the introduction of the live animals and the extraction of the stunned or slaughtered animals, closure devices appropriate to close hermetically said at least one opening, means of aspiration communicating with said chamber to remove air therefrom, means for the feeding of at least one gas appropriate to cause the stunning and/or the slaughtering of the animals in the chamber after a preset absolute pressure has been reached therein, a control unit appropriate to control the aspiration means and the means for the feeding of the gas according to the method of stunning and/or slaughtering in accordance with any one of the preceding claims.

Other objects and features of this invention will be in part apparent and in part pointed out hereinafter.

DETAILED DESCRIPTION OF THE DISCLOSURE

Figure 1:
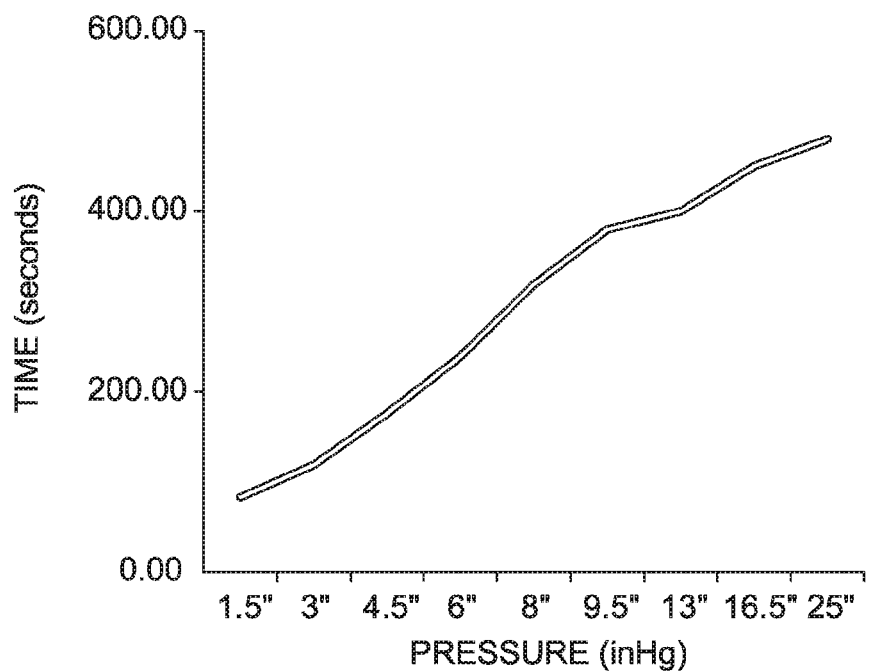
FIG. 1 is a graph depicting the pressure curve used in Example 1.

The present disclosure generally relates to a method for humanely stunning and/or slaughtering animals that have a diaphragm respiratory system. More particularly, the present disclosure relates to a method for slaughtering non-poultry diaphragm respiratory system animals using a low atmospheric pressure system. In particular, the animals are placed into a chamber, the chamber is sealed, and the pressure in the chamber is reduced at a controlled rate to a target decompression pressure and maintained at the decompression pressure until a state of death is obtained. Also disclosed are methods for humanely slaughtering animals, including poultry or non-poultry animals, using low atmospheric pressure in combination with an inert gas. The low atmospheric pressure slaughter described herein is more humane than traditional slaughter techniques, reduces stress to the animal, and thus results in improving meat quality.

The system and methods for stunning and/or killing (seen as slaughter or depopulation and other situations) animals in a controlled atmosphere (CAS, Controlled Atmosphere Stunning) described herein are suitable for all conditions of use as defined by the regulations on the protection of animals at the time of killing (Regulation (EC) no 1099/2009 of the Council of Sep. 24, 2009) regarding poultry, weasels, badgers and skunks, chinchillas, pigs for slaughter, depopulation and situations other than slaughter.

Low Atmospheric Pressure Slaughter

It has now been discovered that non-poultry diaphragm respiratory system animals, such as pigs, may be stunned and slaughtered using a low atmospheric pressure system (LAPS). The system described herein is more humane than prior known stunning/slaughter techniques, such as electrical or mechanical stunning followed by exsanguination, or previously attempted pressure slaughter methods, which involve rapid pressure drops.

In particular, the method of the present disclosure comprises placing at least one non-poultry diaphragm respiratory system animal in a chamber, sealing the chamber, and decompressing the chamber at a continuous rate to a decompression pressure that is lower than the normal atmospheric pressure at which the animal is accustomed to living, and maintaining the decompression pressure until the animal achieves a state of death. In some embodiments, multiple animals may be slaughtered at once, for instance, by placing two or more animals into the chamber prior to decompression. After a state of death is achieved, the chamber is recompressed, and the animal removed from the chamber for further processing. Advantageously, the methods of the present disclosure render the animal unconscious, so that it is unaware of impending death, and does not experience pain. Consequently, the animal experiences less stress and struggling during the slaughter process. Additionally, the low atmospheric pressure methods described herein are a rapid and efficient means for slaughtering diaphragm respiratory animals, such as pigs. In particular, the animals typically achieve a state of death within about 16 minutes or less after the start of decompression.

More particularly, decompression creates a vacuum in the sealed chamber, reducing the available oxygen within the chamber. At the onset of unconsciousness, the animals experience ataxia, i.e., loss of posture (LOP), resulting in the animals being unable to maintain a standing position, and having no neck tension or adverse effect. Because the animals have been rendered unconscious and experience reduced brain activity prior to ataxia, the animals are unaware of their impending death and do not struggle or suffer stress.

Without wishing to be bound by any particular theory, it is believed that during ataxia, cells obtain their energy through the process of anaerobic metabolism. Because neurons have only a minimal reserve of glycogen, the brain itself is not capable of much anaerobic metabolism. Furthermore, the metabolic rate of neurons is much higher than other tissues and, as a result, glucose is continuously being metabolized and storage simply does not occur. Additionally, storage of oxygen in neurons is very minimal. Thus, most neuronal activity depends on second-to-second delivery of glucose and oxygen from the blood. The cessation of blood flow to the brain or decrease in oxygen in the blood resulting from the vacuum created upon decompression results in unconsciousness in the animals.

The target decompression pressure needed to achieve a humane slaughter may vary depending on a variety of factors, such as animal health, animal size, local atmospheric pressure (e.g., altitude at which the slaughter occurs), temperature, humidity, the time it takes to reach the decompression pressure (referred to herein as "lapse time"), and the length of time the decompression pressure is maintained (referred to herein as "hold time"). Typically, however, the decompression pressure will be from about 21 inHg to about 26 inHg, or from about 21 inHg to about 24 inHg, or from about 21 inHg to about 23.5 inHg, or more typically from about 23 inHg to about 25 inHg, and more typically will be about 23.5 inHg.

It should be understood that unless otherwise indicated, pressure values are given herein in inches of mercury (inHg) gauge pressure under vacuum. Thus 25 inHg, as referred to herein, would be an absolute pressure of about 4.92 inHg (assuming atmospheric pressure of 29.92 inHg), or about 16.599 kPa absolute pressure. Additionally, for purposes of the present disclosure, pressure values given herein refer to pressures as measured at mean sea level. It is to be understood, however, that pressures may vary slightly depending on the altitude at which they are measured. As such, it is intended for the pressures given herein to encompass corresponding pressures as measured at different altitudes.

Alternately, the degree of decompression can be expressed as a percent of the atmospheric pressure at which the animals normally live present in the chamber following decompression. For instance, if the atmospheric pressure is 29.92 inHg, a decompression pressure of 25 inHg gauge would be 16.44% of atmospheric. Preferably, the decompression pressure is from about 13% to about 22% of atmospheric, and more preferably is from about 16% to about 20% atmospheric.

Preferably, the pressure in the chamber is lowered at a continuous rate to the decompression pressure. As used herein, "continuous rate" means the rate of pressure drop is generally and substantially uninterrupted and steady; that is, the rate of pressure drop is generally either a straight line or curvilinear pressure draw down without significant individual pressure stages.

In addition to decompression pressure, the time it takes to reach the desired decompression pressure (i.e., the lapse time) may affect the quality of the slaughter. For instance, quick decompressions (i.e., short lapse times) can cause stress to the animal, ear drum damage, and internal organ and tissue damage. Although slower decompressions (i.e., long lapse times) may result in a more humane slaughter, a lapse time that is too long may be detrimental to the animal's well-being by increasing the length of time until the animal is rendered unconscious and unaware of impending death. It is thus preferable to use a lapse time that avoids the detrimental effects of quick decompressions, while minimizing the amount of time the animal is exposed to the low pressure prior to unconsciousness and death. Thus, it is preferable that the lapse time be as short as possible, while still avoiding the detrimental effects of quick decompressions.

Suitable lapse times for use in the methods of the present disclosure are typically at least about 4 minutes, including from about 4 minutes to about 12 minutes, preferably from about 4 minutes to about 8 minutes, and more preferably are about 8 minutes. In some embodiments, the lapse time is between about 4 and about 8 minutes or from about 4 to about 7 minutes. Advantageously, the use of these lapse times results in the animal gradually entering hypoxia, feeling no pain, and demonstrating no adverse reflexes prior to loss of consciousness and death.

It should be recognized that the lapse times provided herein are for slaughters performed at mean sea level. However, lapse time may vary depending on the altitude at which the slaughter is being performed. For instance, the time it takes to reach the target decompression pressure will be somewhat shorter with increase in altitude. In general, the altitude adjustment for lapse time may be calculated by subtracting one second from the lapse time for each one thousand feet increase in altitude.

Once the target decompression pressure is reached, the decompression pressure is preferably maintained for a period of time (i.e., the hold time) until the animal achieves a state of death. As used herein, the term "state of death" is intended to refer to the point at which all vital signs of the animal ceases, and there is a lack of response to stimuli that produce predictable responses.

By maintaining the decompression pressure for a period of time, the meat quality of the slaughtered animals may also be improved. Without wishing to be bound to any particular theory, it is believed that by maintaining the decompression pressure for a period of time, the oxygen concentration in the tissues and blood of the animals is reduced. As a result, the tissue pH becomes stabilized, and many of the metabolic events that typically occur during the post-mortem period are eliminated and/or reduced. Consequently, the color, moisture, and tenderness of the meat obtained from the slaughtered animals is excellent and may have advantages over meat obtained through other slaughter techniques that subject the animals to stressful environments.

Typically, the hold time is at least about 2 minutes, and more typically is at least about 4 minutes, or from about 4 minutes to about 8 minutes. Preferably, the hold time is about 4 minutes. Hold times of greater than 8 minutes may be used and are within the scope of the present disclosure, but are not required to achieve a humane slaughter.

As noted above, the low atmospheric pressure system described herein advantageously results in a more humane slaughter as compared to currently available slaughter methods, such as electrical, mechanical, or gas stunning followed by slaughter and previously attempted pressure slaughter methods. In particular, the slow, continuous pressure decrease allows the animals to adjust their breathing to the reduced air quantity in the chamber as the pressure decreases. The animals thus gradually enter hypoxia, while feeling no pain and demonstrating no adverse reflexes. Advantageously, the pressure decrease renders the animals unconscious prior to occurrence of ataxia, and thus they are not aware of physiological stress or environment, and do not recognize impending death.

Typically, the animals are rendered unconscious after decompression to a pressure of from about 17 inHg to about 21 inHg, and more typically to about 19.5 inHg. Typically, these pressures are reached after about 45 seconds to about 80 seconds of decompression, more typically after about 55 seconds to about 70 seconds of decompression, and more typically after about 70 seconds of decompression. It should be understood that the time following the start of decompression that it takes to reach unconsciousness may vary depending on the target decompression pressure and/or lapse time. For example, the time to unconsciousness would be quicker for a method using a target decompression pressure of 26 inHg and a lapse time of 4 minutes, than it would be for a method using a target decompression pressure of 25 inHg and a lapse time of 4 minutes. Likewise, the time to unconsciousness would be quicker for a method using a target decompression pressure of 25 inHg and a lapse time of 4 minutes than it would be for a method using a target decompression pressure of 25 inHg and a lapse time of 5 minutes.

Following loss of consciousness, which refers to a mental state equivalent to a mental state when an animal is deeply anaesthetized (i.e., brain wave patterns are consistent with an animal being under a surgical plane of anesthesia), the animals will experience ataxia, i.e., loss of posture (LOP). In particular, upon ataxia, the animals are unable to maintain a standing position. Ataxia typically occurs within about 120 seconds or less after the start of decompression, more typically about 45 seconds to about 120 seconds after the start of decompression, more typically about 60 seconds to about 120 seconds after the start of decompression, and more typically about 80 seconds to about 105 seconds after the start of decompression. It should be understood that the time following the start of decompression that it takes to reach ataxia may vary depending on the target decompression pressure and/or lapse time.

Advantageously, the present methods are not only humane, but results in a relatively quick slaughter, with the animals typically achieving a state of death about 16 minutes or less after the start of decompression. For instance, a state of death may be achieved after about 8 to about 16 minutes, and preferably about 8 minutes after the start of decompression. In embodiments where inert gas is inserted into the chamber following decompression, as discussed below, the total slaughter time may further be reduced, with a state of death achievable within about 10 minutes or less, including about 7 minutes or less or about 6 minutes or less after the start of decompression.

Although discussed primarily herein in connection with the slaughter of pigs, any of the methods of the present disclosure described herein may be adapted for use on any type of non-poultry animal having a diaphragm respiratory system including, but not limited to, pigs, sheep, rabbit, cows, goats, llamas, vicunas, alpacas, horses, chinchillas, mustelids and combinations thereof. In some embodiments, such as embodiments where an inert gas is used in combination with low atmospheric pressure to achieve slaughter, as discussed below, the methods of the present disclosure may also be adapted for use on poultry, such as chickens, turkeys, quail, geese, ducks, ratites, ostriches, and combinations thereof.

Inert Gas

In some embodiments, an inert gas may be used in combination with low atmospheric pressure to achieve a more efficient slaughter. In these embodiments, an inert gas may be added to a decompression chamber after a target decompression pressure has been reached. Addition of an inert gas into the chamber significantly reduces the amount of oxygen present in the chamber. As a result, the hold time needed to achieve a state of death is reduced, which thus reduces the overall time period needed to achieve slaughter. Reducing the time period required to achieve a state of death may help increase processing speeds in production plants, allowing for a quicker, more efficient, and cost effective slaughter. Additionally, because the chamber is under vacuum at the time of gas injection, the volume of gas required during the low atmospheric pressure slaughter process is of lesser volume than would typically be required in a non-vacuum chamber. The use of inert gas in combination with low atmospheric pressure thus reduces the cost of slaughter, as compared to previously known gas stunning techniques.

A reduction in the pressure in the decompression chamber may be achieved by aspirating atmospheric air from the chamber. Changing the amount of air in the chamber also changes the concentration of oxygen and other atmospheric components present in the chamber. For instance, the typical composition of the atmosphere (dry air) is about 78% nitrogen ($N_2$); about 21% oxygen ($O_2$); about 0.83% argon; and about 0.03% carbon dioxide; with other components present in smaller quantities. Reducing the pressure in the chamber results in a reduction in the volume of air present in the chamber, and therefore a reduction in the amount of oxygen in the chamber. For example, changing the amount of air aspirated from the chamber may change the amount of oxygen and nitrogen in the chamber from about 21% oxygen and about 78% nitrogen at atmospheric pressure (no vacuum), to about 0% of oxygen and about 0% of nitrogen in the case of absolute vacuum (negative pressure).

Stated another way, because the pressure and volume of the chamber are directly proportional, the pressure inside the chamber will be indicative of the actual air volume remaining following the decompression. For example, if the pressure inside the chamber is reduced by ⅕ during decompression, the volume of air present in the chamber is also reduced by ⅕. Any oxygen remaining following decompression, as well as any remaining air, is evenly distributed throughout the volume of the chamber.

Thus, in one embodiment, an inert gas is added to the chamber after the target decompression pressure has been reached. Preferably, the gas is introduced gradually in the chamber immediately after the chamber has reached the target decompression pressure. Any inert gas known in the art for use in gas stunning may be used including, for example, carbon dioxide ($CO_2$), argon, nitrogen, carbon monoxide, and combinations thereof. Preferably, the inert gas is a combination of carbon dioxide with argon, nitrogen, and/or carbon monoxide, or a combination of inert gases such as nitrogen and/or argon.

After the introduction of the inert gas into the chamber, the animals remain in the chamber until reaching a state of unconsciousness and/or death by anoxia. In particular, as a result of the introduction of gas in the chamber, an atmospheric mixture is obtained composed of rarefied air (resulting from the decompression) and gas which is even poorer in oxygen content. Particularly in the case of birds, since bird lungs are essentially of fixed volume, the volume of air aspirated by the lungs during each respiration cycle is almost constant. Therefore, during each breathing cycle birds inspire the same volume, but instead of air containing (in normal atmospheric conditions) about 21% oxygen, they breathe a mixture composed of rarefied air and gas, thus containing a small concentration of oxygen and a certain amount of gas, which in the case of $CO_2$, will have an anaesthetic effect on the brain of the animals. It has been demonstrated that the presence of carbon dioxide in the air further reduces the amount of oxygen (which is already reduced by effect of the vacuum), causing the death of the animals by anoxia and, for the same percentage of $O_2$ in the chamber, more rapidly and with considerable savings of gas compared to instances in which carbon dioxide or other gases are introduced in chambers under typical atmospheric conditions.

It should be noted that the time of each stunning and/or slaughter cycle depends on the pressure achieved in the airtight chamber; the time taken to reach the target decompression pressure; and the amount of carbon dioxide or other gases introduced.

In one embodiment, the amount of inert gas added to the chamber is at least about 40% of the volume of air remaining in the chamber after decompression. For example, if the pressure inside the chamber is reduced by ⅕ during decompression, the volume of the air present in the chamber is also reduced by ⅕, and the amount of inert gas added to the chamber following decompression will be at least about 40% of the volume of the air remaining in the chamber following decompression (which is ⅕ of the volume of air present in the chamber before decompression).

In one preferred embodiment, the inert gas is carbon dioxide, and the carbon dioxide is added to the chamber in an amount of at least about 30%, and more preferably, at least about 40% of the volume of air in the chamber following decompression. Preferably, the carbon dioxide is added to the chamber in an amount of about 40% of the volume of air in the chamber. As discussed herein, the carbon dioxide has an anesthetic effect on the animal. As a result, the step of introducing carbon dioxide into the chamber contributes, together with the lack of oxygen, to the loss of consciousness or stunning/slaughter of the animal.

In other embodiments, additional inert gases, such as argon or nitrogen, may be added to the chamber in addition to the carbon dioxide. In these embodiments, a mixture of carbon dioxide associated with one or more additional inert gases is added to the chamber in an amount of up to about 40% of the volume of air in the chamber following decompression, including from about 5% to about 40%, and preferably in an amount of from about 20% to about 40%, or from about 20% to about 30% by volume. In still other embodiments, a mixture of carbon dioxide associated with one or more additional inert gases is added to the chamber in an amount of at least about 30%, preferably at least about 40%, and more preferably in an amount of about 40% of the volume of air remaining in the chamber following decompression. Preferably, the mixture of inert gases comprises carbon dioxide in an amount sufficient so that the amount of carbon dioxide added to the chamber is at least about 30% of the volume of air in the chamber following decompression, and preferably is at least about 40% of the volume of air in the chamber following decompression.

In some embodiments, the inert gases are added to the chamber in two phases. For instance, in one embodiment, an inert gas, such as carbon dioxide, is first introduced into the chamber in an amount sufficient to anesthetize the animal, followed by a second addition of inert gas in an amount sufficient to kill the animal. In one such embodiment, inert gas is introduced into the chamber in an amount of up to about 40% of the volume of air in the chamber following decompression, including from about 5% to about 40%, and preferably in an amount of from about 20% to about 40%, or from about 20% to about 30% carbon dioxide by volume. Once the animals have lost consciousness, an additional amount of carbon dioxide is added to the chamber in an amount suitable for slaughter of the animals. Preferably, the second gas addition is in an amount of at least about 40% of the volume of air remaining in the chamber after decompression, and preferably is an amount of about 40% of the volume of air remaining in the chamber after decompression. Optionally, other inert gases may be additionally added to the chamber during the first and/or second gas addition step.

In other embodiments, an inert gas, such as carbon dioxide, is introduced into the chamber in an amount at least about 40%, and preferably about 40% of the volume of air in the chamber following decompression. Once the animals have lost consciousness, an additional amount of carbon dioxide is added to the chamber in an amount suitable for slaughter of the animals. In this embodiment, the second gas addition is preferably in an amount of at least about 20% of the volume of air remaining in the chamber after decompression. In one particular embodiment, the first carbon dioxide addition is in an amount of about 40% of the volume of air in the chamber following decompression, and the second carbon dioxide addition is in an amount of about 20% of the volume of air remaining in the chamber after decompression. Optionally, other inert gases may be additionally added to the chamber during the first and/or second gas addition step.

In another embodiment, inert gases, such as argon, nitrogen, or combinations thereof are added to the decompression chamber after the target decompression pressure has been reached in amounts of at least about 1% of the volume of air in the chamber following decompression. In other embodiments, the inert gas is carbon monoxide, and the carbon monoxide is added to the chamber in an amount of at least about 1%, and more preferably, at least about 4% of the volume of air in the chamber following decompression. Optionally, the inert gas may be a mixture of carbon monoxide associated with other inert gases.

The method for stunning and/or slaughtering animals according to these aspects of the present invention thus comprises the step of selecting the pressure in the chamber to be achieved and the percentage of gas to be introduced into the chamber after decompression. Furthermore, the method comprises the step of selecting the total time of residence of the animals in the chamber.

In embodiments where inert gas is used in combination with low atmospheric pressure to achieve slaughter, the target decompression pressure will typically vary from about 0 mbar to about 1000 mbar absolute pressure (corresponding to an absolute pressure of about 0 to about 29.53 inHg). Preferably, the target decompression pressure will be about 200 mbar (i.e., about 5.9 inHg) or greater absolute pressure. In such embodiments, the absolute pressure inside the chamber will preferably not rise above 845 mbar (24.95 inHg) during slaughter. The time to reach the target decompression pressure will typically be at least about 30 seconds, and more typically will be from about 30 to about 720 seconds, or from about 30 to about 600 seconds. In some embodiments, the absolute pressure inside the chamber will be at least about 200 mbar, with the lapse time for reaching this pressure being at least about 30 seconds. Preferably, the overall time of residence of the animals in the chamber is between about 80 seconds and about 600 seconds.

Inert gas may be used in combination with low atmospheric pressure to achieve slaughter of any diaphragm or non-diaphragm respiratory system animal, including, but not limited to, pigs, sheep, rabbit, cows, poultry, mustelids (weasels, badgers, etc.) skunks, chinchillas, goats, llamas, vicunas, alpacas, horses, and the like. In some embodiments, inert gas is used in combination with the low atmospheric pressure slaughter of non-poultry diaphragm respiratory system animals, as described elsewhere herein. In other embodiments, inert gas may be used in combination with the low atmospheric pressure slaughter of poultry, such as is described in U.S. Pat. Nos. 7,662,030 and 8,113,926, which are herein incorporated by reference in their entirety.

For instance, in some embodiments, the animals are placed into a chamber, the chamber is sealed, and the pressure in the chamber is reduced at a controlled rate to a target decompression pressure. Once the target decompression pressure has been reached, inert gas may be added to the chamber according to any of the methods disclosed herein, and the decompression pressure maintained until the animal achieves a state of death. In some embodiments, the target decompression pressure for non-poultry diaphragm respiratory system animals may be from about 21 inHg to about 26 inHg, or from about 21 inHg to about 24 inHg, or from about 23 inHg to about 25 inHg, and preferably will be about 23.5 inHg gauge (under vacuum), and the lapse time may be at least about 4 minutes, including from about 4 minutes to about 12 minutes, or between about 4 minutes and about 8 minutes. In some embodiments, the target decompression pressure for poultry may be from about 21 inHg to about 27 inHg, more typically from about 24 inHg to about 25 inHg, and preferably will be about 25 inHg gauge (under vacuum), and the lapse time may be at least 30 seconds, including from about 30 seconds to about 120 seconds, or from about 50 seconds to about 75 seconds.

As discussed herein, once the target decompression pressure has been reached, inert gas may be added to the chamber according to any of the methods disclosed herein, and the decompression pressure maintained until the animal achieves a state of death. As discussed above, addition of the inert gas to the chamber may reduce the hold time needed to achieve a state of death, as compared to slaughter performed using low atmospheric pressure, but without addition of inert gas. For instance, when inert gas is added to the chamber, the hold time for will typically be from about 2 minutes to about 4 minutes, and typically is about 3 minutes.

The embodiments of the present invention involving the use of inert gas are based on controlling the volume of gas introduced into the chamber, and consequently on controlling the percentage of oxygen in the chamber. Because the pressure and the volume of air inside the airtight chamber are correlated, the correct percentage of gas to be introduced into the airtight chamber can be achieved with considerable accuracy in order to achieve the desired concentration of oxygen. By precisely controlling the oxygen concentration after introducing the gas, the stunning and/or slaughter can be customized relative to the size of the animals. For example, with small chickens (e.g., about 1.8 kg live) a 200 mbar absolute pressure may be reached quickly, up to a total residence time in the chamber of about 2 minutes, while for larger chickens (e.g., about 3.6 kg live), a 200 mbar absolute pressure and all the intermediate steps may be reached in longer times.

Figure 3:
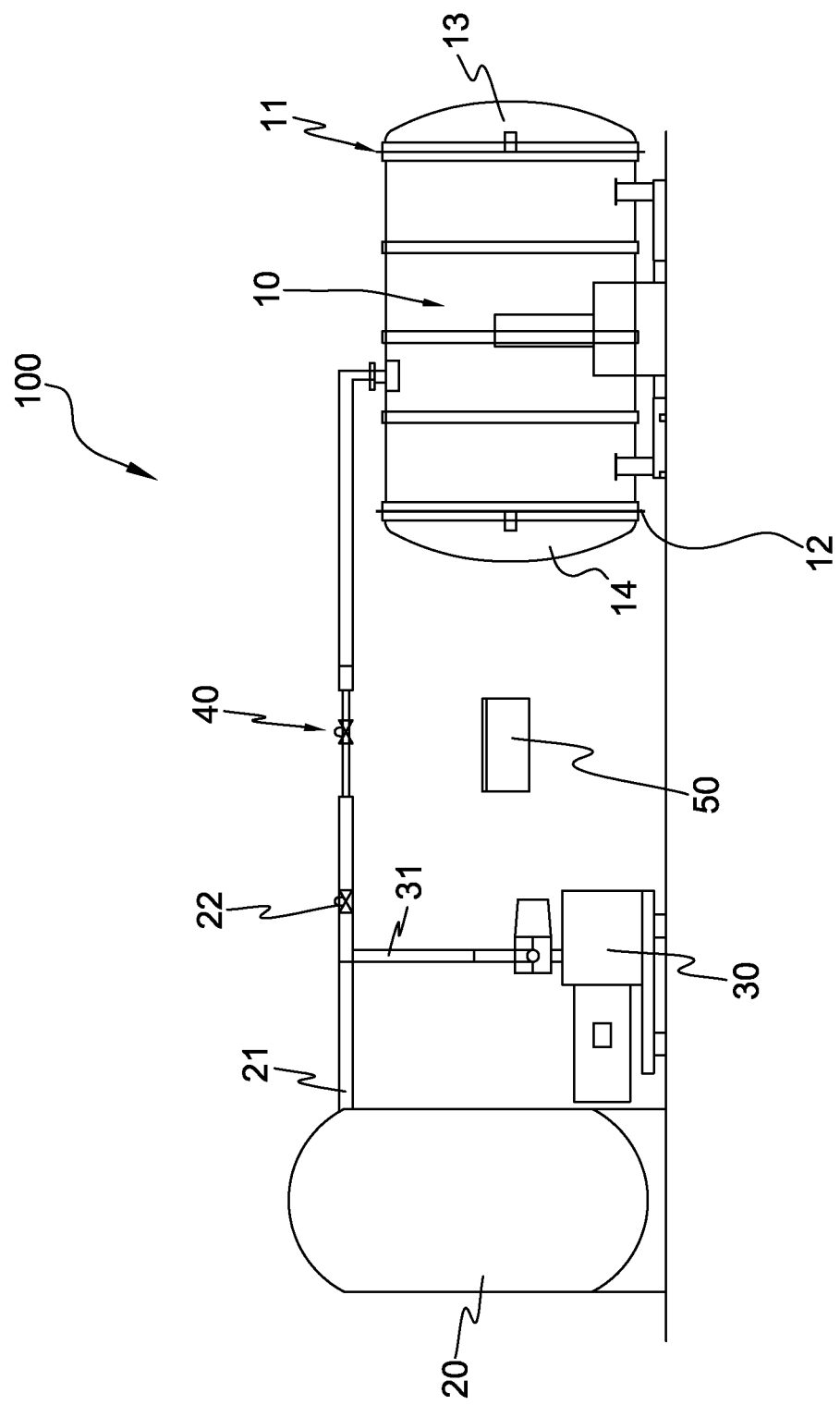
FIG. 3 is a schematic representation of a plan view from one side of a system for stunning and/or slaughter of the present disclosure.
Figure 4:
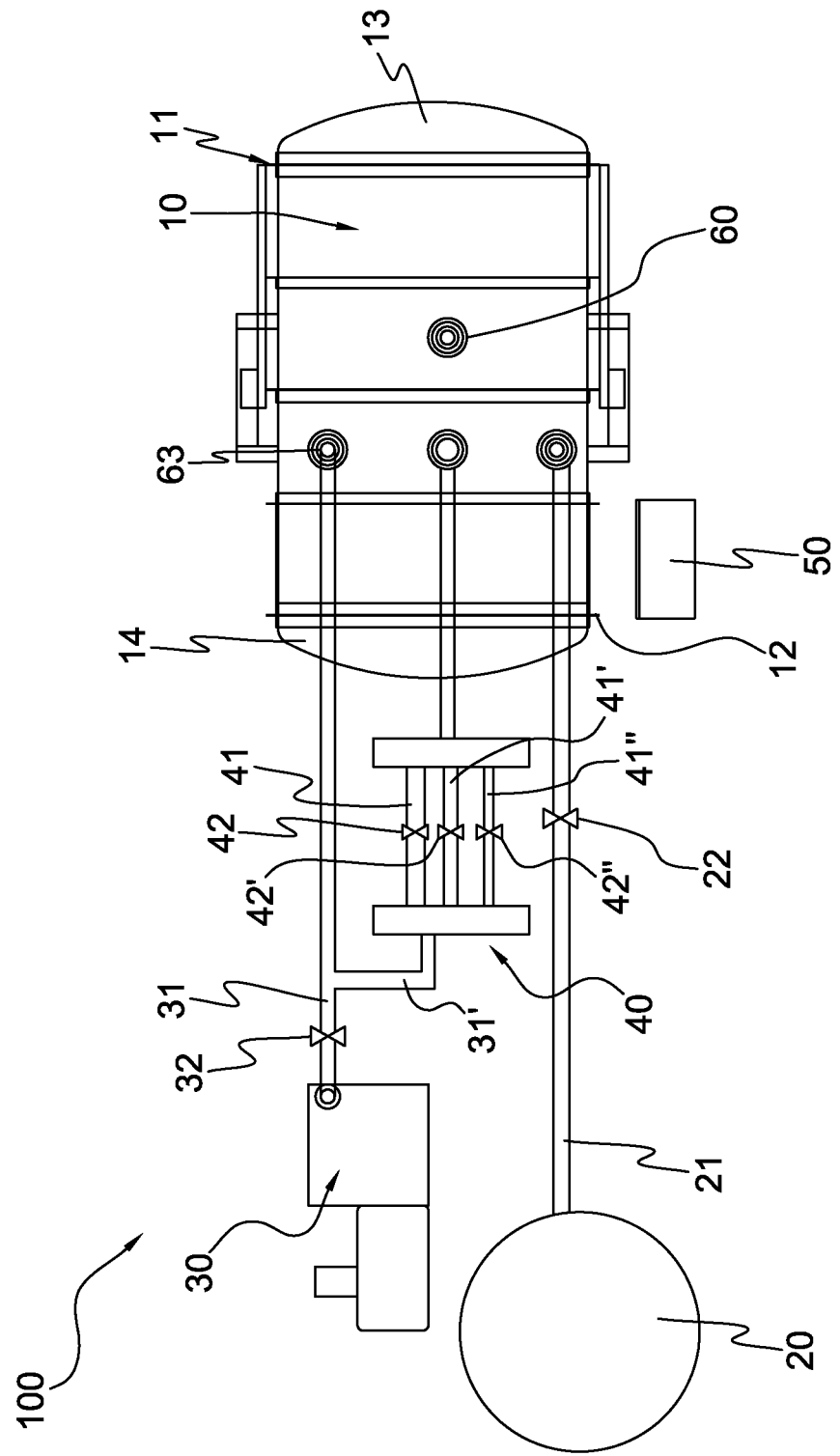
FIG. 4 depicts a plan view from above the system of FIG. 3.

With reference to the exemplary chamber discussed herein and depicted in FIGS. 3 and 4, in some embodiments, the present disclosure is directed to a method of stunning and/or slaughtering meat animals, comprising the steps of: bringing the animals into an airtight chamber (10) and closing the chamber (10); creating a vacuum inside the chamber (10) in such a way as to reach an absolute pressure lower than the ambient pressure external to said chamber (10); after the absolute pressure has been reached, adding into the chamber (10) at least one gas appropriate to cause the stunning and/or the slaughtering of the animals, said gas in such a quantity as to reach a preset percentage of the volume of air remaining in the chamber (10) after decompression. In some embodiments, the method may further comprise the step of selecting the quantity of gas to be fed into the chamber (10) after decompression as a function of the absolute pressure created in the chamber (10). The quantity of gas fed may be controlled by means of the measuring of the effective pressure inside the chamber (10).

The methods of the present disclosure may additionally comprise a further step of introducing at least one gas appropriate to cause the slaughter of the animals, said gas in such a quantity as to reach a preset percentage of the volume of air remaining in the chamber (10) after decompression. In various embodiments, the percentage of gas to be fed is equal to or higher than 20% of the volume of air remaining in the chamber (10) after decompression in the case of carbon dioxide ($CO_2$).

The methods of the present disclosure may further comprise the step of selecting the total time the animals stay in the chamber (10), and wherein the total time the animals stay in the chamber (10) is comprised between 80 seconds and 600 seconds.

The methods disclosed herein may be used in connection with a variety of animals, including poultry, pigs, chinchillas, mustelids, rabbits and animals used for fur.

The methods for stunning and/or killing animals, particularly poultry, weasels, skunks and badgers, chinchillas, pigs for slaughter or depopulation and situations other than slaughter provides, depending on the conditions of use set out (as per the rules on the protection of animals at slaughter—Regulation (EC) No. 1099/2009 of the Council of 24 Sep. 2009) for one or two steps of introducing gas into the chamber 10 to cause the death of animals by anoxia (reduction or lack of oxygen).

In particular, the percentage of gas to introduce may be greater than or equal to 20% of the volume of air remaining in the chamber (10) after decompression in the case of carbon dioxide ($CO_2$).

For example, the method involves, after a first introduction of 40% of $CO_2$ gas, a further step of introducing $CO_2$ suitable for causing the slaughter of animals, said gas in a percentage equal to 20% of the volume of air, remaining in the chamber 10 after decompression.

As said, the control of the percentage of gas to be introduced can easily be managed by controlling the pressure inside the airtight chamber 10.

Advantageously, the precise control of the quantity of gas to introduce is, in addition, achieved at full operating regime of the slaughter plants through the use of one or more intermediate tanks, connected by pipes to the hydraulic system 40, containing gas or gas mixtures. The intermediate tanks, at ambient pressure of 1 atm, have the required capacity to introduce into the airtight chamber 10 the proper percentage of gas.

As discussed above, previously known stunning methods that use gas suffer from several drawbacks, including:

difficulty of dosing, as required by the current regulations, the proper amount of gas to be introduced into the gas chamber (as defined in the terms of use of the above-mentioned legislation) according to species, category, weight, number of animals present in the chamber and the permanence of the same as the speed of the slaughter line varies; and high gas consumption during slaughter/killing, in that the percentage of gas to be introduced depends on the amount of air present in the chamber (amount which depends on the size of the chamber itself, which is defined depending on the number of animals that pass through said chamber continuously) and guaranteed minimum times for slaughter, as laid down in the aforementioned legislation.

Additionally, use of low atmospheric pressure for stunning/slaughter of animals is effective, but may be expensive in terms of energy costs and, in order not to cause injury to the animals, is achieved gradually, thereby lengthening the process times for slaughter.

Advantageously, the methods for stunning and/or slaughter of animals according to the present invention, makes it possible to reduce stunning and/or slaughter times of the animal while considering animal wellbeing. The quantity of gas to be introduced can be precisely controlled for different types of animals, depending on their weight, number, line speed and residence time in the chamber. The cost associated with the use of carbon dioxide or other inert gases, as well as emissions of carbon dioxide into the atmosphere, are also reduced when using the methods of the present disclosure, as compared to traditional gas stunning systems, since lower amounts of gas are required. Additionally, the use of inert gas in combination with low atmospheric pressure slaughter reduces the energy consumption required to create the vacuum, since the working pressure inside the chamber is higher than that used in traditional LAPS systems, resulting in greater well-being for the animals, and in the case of smaller birds reduced breaking of the wings.

Decompression Chamber

As noted above, prior to decompression, the animals slaughtered using the methods of the present disclosure are enclosed in a sealed chamber. Any suitable decompression chamber known in the art or commercially available may be used to perform the methods described herein, such as those described in U.S. Pat. No. 2,588,770 (Sadler) and U.S. Pat. No. 3,548,447, herein incorporated by reference in their entirety. One example of a suitable decompression chamber is described in the Test Methods section of the Examples. In one particular aspect, a suitable chamber is the chamber described in U.S. Patent Application Publication No. 2006/0009142 A1, herein incorporated by reference in its entirety.

In one exemplary embodiment, the decompression chamber is a commercial sized metal chamber suitable for use in an animal processing plant. The chamber may vary in size depending on the needs of the processing plant production speed. For instance, the chamber will preferably be of such a size so as to allow the slaughter of the desired quantity of animals in a timely manner, which matches or slightly exceeds the processing line speed of the processing plant. The chamber may be sized to hold one animal at a time, or may be sized to hold two or more animals at once. Each end of the chamber comprises doors to allow for entrance and exit of the animals. Preferably, the doors are operated hydraulically. In such an embodiment, hydraulic lines connect the entrance and exit chamber doors to a hydraulic pump, which powers the opening and closing of the doors. In one embodiment, the floor of the chamber may comprise a moving conveyor, such as a rubber conveyor, to gently move the animals into and out of the chamber. The conveyor may be powered by any suitable means, including hydraulic or electric power. In some embodiments, the chamber may also be affixed with an infrared camera connected to a screen monitor, which allows the animals to be observed during the stun/slaughter process.

The pressure within the chamber may be controlled by any suitable means known to those skilled in the art. In one exemplary embodiment, low atmospheric pressure is achieved within the chamber by means of a vacuum pump connected to the chamber by means of a pipe line. A modulating valve may be attached at the pipe entrance into the chamber to precisely control the lowering of pressure within the chamber. The chamber may further optionally have an air pressure release valve and pipe to assist with repressurization of the chamber.

In some embodiments, the chamber may be equipped to allow for addition of inert gases into the chamber. In such an embodiment, the chamber may be connected to one or more compressed gas cylinder(s) by means of a compressed gas line(s). Calibration equipment may be attached to the line or gas cylinder or chamber to monitor gas conditions, such as gas concentration, duration of exposure, and temperature of gas. In order to facilitate removal of the gas from the tank and a return to ambient atmosphere, the chamber may be vented to the atmosphere.

An automated data acquisition and control system may be used to monitor tank pressure and control pump operation. More particularly, a modulating valve controlled by the control system may be used to precisely control the rate of decompression.

When such a chamber is used, the animals are herded into the chamber, and the entrance door is closed. Decompression is started using the automated control system. Once the target decompression pressure is reached, the modulating valve is closed and gas may optionally be inserted into the chamber until a state of death is obtained. The chamber is then recompressed, the exit door is opened, and the conveyor floor is activated. The slaughtered animals are moved from the chamber along the conveyor and onto a metal slide chute, where they are hooked and placed on the processing line for further processing.

An exemplary system for stunning and/or slaughtering animals using the methods of the present disclosure are depicted in FIGS. 3 and 4. As shown in FIGS. 3 and 4, the system 100 for stunning and/or slaughter of animals according to the present disclosure comprises an airtight chamber 10 provided with at least one opening 11, 12 for the introduction of the live animals and the extraction of the stunned or slaughtered animals, and closing devices suitable to hermetically close said at least one opening 11, 12.

Preferably, the chamber 10 has an entrance opening 11 for the introduction of live animals and an exit opening 12 for the extraction of the stunned or slaughtered animals, a respective closing device 13, 14 being associated with each opening 11, 12.

Animals may be introduced into the system locked up in one large cage or in a succession of smaller cages, or in bulk.

The closing devices 13, 14 associated with the openings 11, 12 are for example of the tilting type, or revolving door type with vertical or horizontal axis. In any case, the closing devices 13, 14 are operable advantageously by means of electric, pneumatic or hydraulic actuators. The chamber 10 is equipped with a balancing valve 60, to balance the internal pressure of the chamber 10 with the external pressure (atmospheric pressure).

The system 100 comprises suction means 30 communicating with said chamber 10 to remove the air from it. The suction means 30 are suitable to create a depression inside the chamber in such a way as to achieve a lower pressure than the external ambient pressure. Ambient pressure is understood to mean the actual atmospheric pressure outside the chamber, which depends on the altitude of the place where the system 100 is located.

The suction means 30 may comprise, for example, an electrically-operated pump, connected to the chamber 10 via a duct 31 to which a first check valve 32 is associated for opening and closing said suction pipe 31. In addition, the pipe 31 is equipped, near the entrance of the chamber 10, with a modulating valve 63.

Preferably, near the airtight chamber 10 a hydraulic system 40 is placed, connected via a bypass duct 31' to the suction means 30.

The hydraulic system 40 comprises at least one pipe 41 fitted with a check valve 42.

In particular, the hydraulic system 40 comprises a plurality of pipes 41, 41', 41" of different diameters, wherein each pipe is equipped with a valve 42, 42', 42" of the on-off type.

Advantageously, by acting on the valve 32 and on one of the valves 42, 42', 42" the correct suction time is defined for achieving the depression required inside the chamber 10, depending on the type of animals, their weight, the number thereof and depending on the line speed and residence time in the chamber as provided for in the instruction manual supplied by the manufacturer.

In one embodiment variant, the hydraulic system 40 comprises a pipe 41 fitted with a modulating valve, suitable to also partially close the relative pipe, again depending on the type of animal which the chamber is used for.

In some embodiments, the system comprises means 20 of introducing a gas into the chamber 10 after it has reached a vacuum pressure below atmospheric pressure. The means 20 of introducing gas into the chamber 10 may comprise a tank.

For instance, in certain embodiments, near the airtight chamber 10, in addition to the suction means 30, a tank 20 is provided containing a gas to be introduced into the airtight chamber 10. A second shut-off valve 22 is connected to the pipe 21 connecting said tank 20 to the chamber 10 for the opening and closing of the pipe 21.

The system 100 advantageously comprises a control unit 50 designed to control and synchronize the suction means 30, the tank 20 of gas, the closing devices 13, 14 of the airtight chamber 10, the hydraulic system 40 and the check valves 22, 32. In particular, the control unit 50, after the hermetic closure of the doors of the chamber via a special program, controls the opening and closing of the check valves 22, 32 and the actuation of the hydraulic system 40, i.e. the opening and closing of each of the check valves 42, 42', 42".

The control unit 50 is provided with a user interface comprising setting means suitable to allow the operator to set the values of pressure (decompression) to be realized in the chamber 10, the percentage of gas to be fed into the chamber 10 after decompression, and to set the values of the total residence time of the animals in the chamber 10.

The control unit 50 may comprise a programmable logic controller (PLC) for monitoring and controlling conditions in the chamber, advantageously a display connected to the PLC, and a recorder which records all the indicative factors such as the values of the pressure and the percentage of gas in the airtight chamber 10 and preferably the percentage of oxygen present in the chamber.

The system 100 comprises a probe (not shown) that reads the pressure and the pressure variations in the airtight chamber 10, and sends these values to the control unit 50, and preferably to the display connected to the PLC and to the recorder.

Preferably, the system 100 comprises a pressure switch programed or programmable on the basis of the environmental pressure. The control unit 50 is thus suitable, taking into account the proper starting value (environmental pressure), to transmit to the suction means the correct pressure difference value (Δ pressure) so as to create the correct depression in the chamber until the desired pressure is achieved. Advantageously, the control unit 50 is provided, in case of breakdown, with an automatic reset system of the system.

Advantageously, the control unit 50 commands the means 20, 21, 22 for the introduction of the gas on the basis of pressure values detected by the probe. Preferably, the system 100 comprises a pressure gauge and/or a vacuum gauge, and a transducer, suitable to control the pressure and the pressure variations in the airtight chamber 10. The control unit 50 thus receives the signal of opening and closing of the valves 22, 32, 42, 42', 42" from the probe that reads the pressure (or rather the depression) generated in the airtight chamber 10 when the pump 30 is activated and the pressure increase which is generated in the airtight chamber 10 when the introduction of gas from the tank 20 is activated.

The system 100 may comprise detection means of the vital activity of the animals in the chamber 10. For example, the detection means comprise at least one camera, for example infrared, which films the steps of the stunning and/or killing cycle of the animals inside the airtight 20 chamber 10.

The stunning and/or slaughter of the animals is thus implemented.

In the airtight chamber 10, where the live animals are introduced, a depression is created by the pump 30 connected to the chamber 10 via the pipe 31.

In some embodiments, once the airtight chamber 10 has been placed in a vacuum, the first check valve 32 is closed automatically and simultaneously the second check valve 22 is opened to connect the tank 20 of gas to the chamber 10, with the gas expanding in said chamber.

After the opening of the closures 13, 14 and the unloading of the stunned or dead animals and replenishing with new live animals, the cycle may be repeated.

The method for stunning and/or slaughter of animals provides for a step during which, by means of the pump 30 and the actuation of the check valve 32, creates a pressure reduction (or vacuum) in the chamber 10 compared to atmospheric pressure.

The reduction of pressure or vacuum in the airtight chamber 10 is variable and depending on the opening of the hydraulic system 40, that is to say by modulating valve 20 or one of the on-off valves 42, 42', 42", a desired vacuum pressure is achieved (i.e. the reduction of the internal pressure of the airtight chamber 10) in a predetermined period of time.

In the alternative depicted in FIG. 4 in which the pipes 41, 41', 41" of the hydraulic system 40 have different diameters, the reduction of pressure in the airtight chamber 10 is achieved by combining the opening and/or closing of different pipes.

For example, with reference to the alternative depicted in FIG. 4, (in which the pipe 41 has a larger diameter than the pipe 41', and the pipe 41' has a larger diameter than the pipe 41") it is possible to achieve an absolute pressure of 200 mbar (about 5.9 inHg) inside the chamber in 60 seconds by opening the check valve 32 and the valve 42 relative to the pipe 41, and it is possible to achieve an absolute pressure of 200 mbar inside the chamber in 90 seconds by opening the check valve 32 and the valve 42' relative to the pipe 41'.

The depression in the airtight chamber 10 is obtained by aspirating air that contains nitrogen and oxygen in the standard percentages discussed herein from the chamber. The reduction in pressure results in a reduction in the volume of air present in the chamber and therefore a reduction of the amount of oxygen present in the chamber 10. The oxygen remaining in the chamber, as well as the residual air, is evenly distributed throughout the volume of the chamber.

As discussed herein, gas may be introduced into chamber 10 after the chamber has reached the desired decompression pressure. The pressure gauge and the transducer of the pressure values inside the chamber 10 make it possible to precisely identify the desired depression, the consequent closure of the aspiration valve 32 and the simultaneous opening of the inlet valve 22 of the gas, which is closed upon reaching the exact quantity of introduced gas, determined depending on the new pressure reached.

While the disclosure has been described in terms of various specific embodiments, those skilled in the art will recognize that the disclosure can be practiced with modification within the spirit and scope of the claims.

EXAMPLES

Test Methods

Decompression Chamber:

The decompression chamber used in Examples 1 and 2 was a commercial size metal chamber measuring 7 feet in diameter and 17.5 feet in length and having a volume of 675 cubic feet. The chamber was equipped with hydraulically operated doors at the end of the chamber for entrance and exit of the animals. The floor within the chamber comprised a rubber conveyor that was used to gently move the animals into and from the chamber. An infrared camera was affixed within the chamber and connected to a screen monitor, to allow the animals to be observed during low atmospheric pressure treatment. The chamber was connected to a vacuum pump sufficient in size to meet the decompression time/pressure parameters by a pipe line containing a modulating valve, which was used to precisely control the lowering of pressure within the chamber. The chamber was equipped with an insertion tube for injection of inert gas. A PC-based data acquisition and control system was used to monitor pressure and control pump operation.

A similar chamber having a volume of 1000 liters was used in Examples 3-6. FIGS. 3 and 4 depict a schematic representation of a plan view of the slaughter systems used in Examples 1-6.

Pressures: Unless otherwise indicated, pressure levels given in Examples 1, 2, and 7 are in gauge pressure in inHg, as measured under vacuum. The pressure levels given in Examples 3-6 are absolute pressure.

Example 1

The behavior of pigs during slaughter can be used to evaluate the quality of the stun and slaughter process. In this example, the behavior of pigs slaughtered using low atmospheric pressure was evaluated.

To begin, two pigs were herded into the decompression chamber described in the Test Methods section, and the entrance door closed. The camera in the chamber was activated as decompression was initiated, and the video feed was monitored for the duration of the treatment. The pigs were subjected to low atmospheric pressure treatment, with a target decompression pressure of 25 inHg gauge, a lapse time of 480 seconds, and a hold time of 4 minutes. The pigs' behavior during treatment was observed. The low atmospheric pressure treatment was conducted at a temperature of 84.0° F., a humidity of 88%, and a barometric pressure of 29.44 inHg. The time to various pressures during the treatment are set forth in Table 1, and a plot of the time to various pressures is depicted in FIG. 1.

TABLE 1

| Pressure (inHg gauge) | Time to pressure (seconds) |
| --- | --- |
| 1.5 | 60 |
| 3 | 119 |
| 4.5 | 176 |
| 6 | 239 |
| 8 | 319 |
| 9.5 | 380 |
| 13 | 400 |
| 16.5 | 450 |
| 25 | 480 |

No reaction to the decreased pressure was observed until the pressure reached 22 inHg. The pressure decrease was so slow, that loss of posture was delayed. Loss of posture appeared to be pleasant, but labored breathing was visible. No pigs survived the treatment.

Example 2

Figure 2:
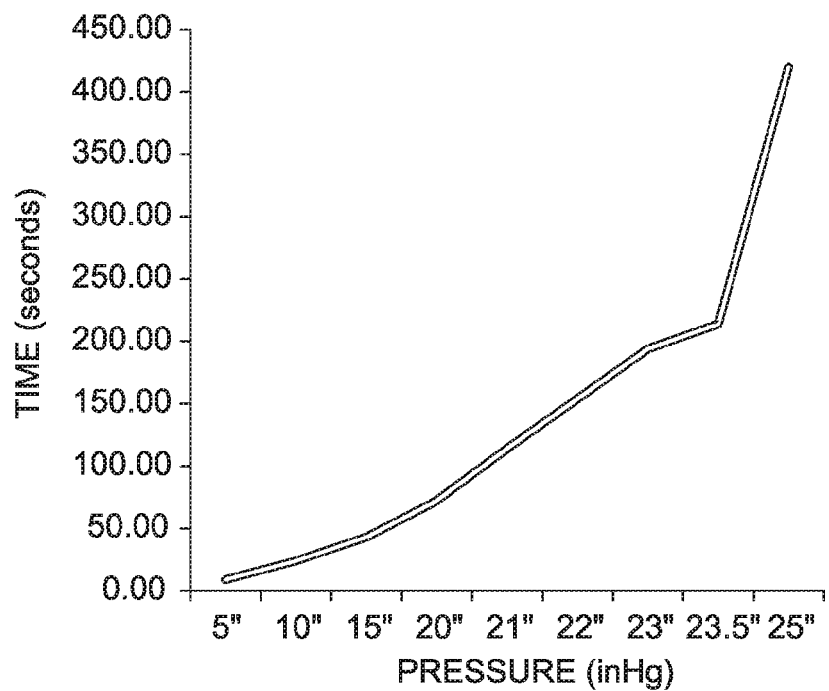
FIG. 2 is a graph depicting the pressure curve used in Example 2.

In this example, the process of Example 1 was repeated using the conditions set forth in Table 2 (target decompression pressure 25 inHg, lapse time 420 seconds, hold time 4 minutes). A plot of the time to the various pressures is depicted in FIG. 2. The low atmospheric pressure treatment in this example was conducted at a temperature of 86.9° F., a humidity of 78%, and a barometric pressure of 29.41. Two pigs were evaluated.

TABLE 2

| Pressure (inHg gauge) | Time to pressure (seconds) |
| --- | --- |
| 5 | 9 |
| 10 | 24 |

TABLE 2-continued

| Pressure (inHg gauge) | Time to pressure (seconds) |
|---|---|
| 15 | 43 |
| 20 | 72 |
| 21 | 114 |
| 22 | 154 |
| 23 | 194 |
| 23.5 | 214 |
| 25 | 420 |

In this treatment, movement before loss of posture was observed, but appeared to be jostling for position. Loss of posture occurred at 100 seconds. No movement was observed after 198 seconds. No pigs survived the treatment.

Example 3

In this example, the slaughter of a chicken using the combination of low atmospheric pressure and a two phase addition of carbon dioxide gas was demonstrated. Unless otherwise indicated, the pressures given in Example 3 are absolute pressure.

A chicken of average weight (1.8 kg) was placed in the decompression chamber, and the pressure was lowered to about 300 mbar (about 8.85 inHg) (absolute pressure) in about 46 seconds. This absolute pressure (300 mbar) corresponds to a volume of air of 300 liters uniformly distributed inside the chamber and in which there is thus a quantity of nitrogen ($N_2$) equal to about 78% (corresponding to 234 liters), and an amount of oxygen ($O_2$) equal to about 21% (corresponding to 63 liters). Therefore, the concentration of evenly distributed oxygen in the chamber (at depression of 300 mbar) was equal to 6.3% of the volume of the chamber (1000 liters).

Carbon dioxide gas was then introduced into the chamber in an amount of 40% of the volume of air in the chamber (300 liters); i.e., corresponding to 120 liters of carbon dioxide gas. Adding the volume of carbon dioxide gas (120 liters) to the volume of residual air present in the chamber (300 liters) gave a total volume of the mixture (air+gas) of 420 liters, which corresponds to an absolute pressure of 420 mbar (about 12.4 inHg). Thus, the pressure in the chamber after addition of the carbon dioxide was (420 mbar), which was greater than the initial decompression pressure (300 mbar).

The concentration of oxygen evenly distributed in the chamber (in depression) after the introduction of the carbon dioxide gas fell to 4.5% of the volume of the chamber itself. The oxygen concentration was determined according to the following equation: volume of air remaining (300 liters)/volume of mixture (420 liters)×6.3% oxygen=4.5%.

Once the animals inside the chamber reached a state of unconsciousness, an additional amount of carbon dioxide gas equal to 20% of the volume of air in the chamber after the reduction of pressure (300 liters) was introduced (i.e., corresponding to 60 liters of carbon dioxide gas). Adding the volume (60 liters) of carbon dioxide gas to the volume of the previous mixture (420 liters) gives to a total volume of the mixture (air+gas) of 480 liters. This corresponds to an absolute pressure of 480 mbar (about 14.17 inHg).

With the addition of 180 liters of carbon dioxide gas (120 liters from phase 1+60 liters from phase 2) the concentration of oxygen in the chamber fell from the initial 6.3% resulting from the depression alone to 4.5% after the first phase of carbon dioxide gas introduction (40% volume of $CO_2$), to 3.96% following the second phase of carbon dioxide gas introduction (20% volume of $CO_2$).

The decompression pressure was maintained until the cycle time (total residence time of the bird in the chamber) reached 3 minutes and 30 seconds. The bird was found dead 3 minutes after the start of the cycle but the decompression pressure was maintained for a further 30 seconds inside the chamber after death. A lack of behavioral response by the bird indicated death.

Notably, the amount of oxygen in the chamber after the second phase of carbon dioxide gas addition (i.e., 3.96% of $O_2$ in the chamber) was similar to what would be achieved in a gas stunning and/or slaughter system after introducing gas in a chamber at atmospheric pressure in an amount of about 81% of the volume of air in the chamber (in the case of a chamber of 1000 liters of volume, 810 liters of air would be replaced with 810 liters of added gas). After such gas introduction, a mixture (air and gas) would form in which the air is 19% of the mixture (corresponding to 190 liters in a chamber with 1000 liters of volume). Since air contains 21% oxygen, 39.9 liters of $O_2$ would be present in the chamber, corresponding to a concentration of about 3.99%. Thus, the method according to the present example achieves the same result as a traditional gas slaughter without low pressure only using a much lower amount of gas (180 liters vs. 810 liters), in the case of the current example.

The amount of oxygen in the chamber after the second phase of carbon dioxide gas addition (i.e., 3.96% of $O_2$ in the chamber) is similar to what would be achieved in a LAPS stunning and/or slaughter system after lowering the pressure in the chamber to an absolute pressure of about 189 mbar (about 5.58 inHg). After such depression a volume of air equal to 189 liters would remain in the chamber, of which about 39.69 liters would be $O_2$, expanding throughout the volume of the chamber. This corresponds to a concentration of oxygen of 3.96%. Thus, by creating a depression up to the absolute pressure of 300 mbar, the same slaughter result is achieved as with a depression up to 189 mbar with no gas input. The use of inert gas in combination with low atmospheric pressure thus enables energy savings and greater animal well-being.

Example 4

In this example, the slaughter of a chicken using the combination of low atmospheric pressure and a two phase addition of carbon dioxide gas was demonstrated. Unless otherwise indicated, the pressures given in Example 4 are absolute pressure.

A chicken of average weight (1.8 kg) was placed in the decompression chamber and the pressure was lowered to about 234 mbar (about 6.9 inHg) (absolute pressure) in about 60 seconds. This absolute pressure value (234 mbar) corresponds to a volume of air of 234 liters evenly distributed inside the chamber and in which there is a quantity of nitrogen ($N_2$) equal to 78% (corresponding to approximately 184 liters) and a quantity of oxygen ($O_2$) equal to 21% (corresponding to about 49.2 liters). Therefore, the concentration of evenly distributed oxygen in the chamber (in depression of 300 mbar) was equal to 4.91% of the volume of the chamber (1000 liters).

Carbon dioxide gas was then introduced into the chamber in an amount of 40% of the volume of air in the chamber (234 liters); i.e., corresponding to about 93 liters gas. Adding the volume of carbon dioxide gas (93 liters) to the volume of residual air present in the chamber (234 liters) gives a total volume of the mixture (air+gas) of about 327 liters, corresponding to an absolute pressure of 327 mbar (about 9.65 inHg). Thus, the absolute pressure in the chamber after addition of the carbon dioxide gas was 327 mbar, which was greater than the initial decompression pressure (234 mbar).

The concentration of oxygen evenly distributed in the chamber (in depression) after the introduction of gas fell to 3.51% of the volume of the chamber itself. The oxygen concentration was determined according to the following equation: volume of remaining air (234 liters)/volume of mixture (327 liters)×4.91% oxygen=3.51%.

Once the animals inside the chamber reached a state of unconsciousness, a further amount of carbon dioxide gas equal to 20% of the volume of air in the chamber after the reduction of pressure (234 liters) was introduced (corresponding to about 47 liters of gas). Adding the volume (47 liters) of carbon dioxide gas to the volume of the previous mixture (327 liters) gives a total volume of the mixture (air+gas) of 374 liters. This corresponds to an absolute pressure of 374 mbar (about 11.0 inHg).

With the addition of 140 liters of carbon dioxide gas (93 liters from phase 1+47 liters from phase 2), the concentration of oxygen in the chamber fell from the initial 4.91% resulting from depression alone, to 3.51% after the first phase of gas introduction (40% volume of $CO_2$), and to 3.07% following the second phase of gas introduction (20% volume of $CO_2$).

The decompression pressure was maintained until the cycle time (total residence time of the bird in the chamber) reached at 2 minutes and 30 seconds. The bird was found dead after 2 minutes and 10 seconds from the start of the cycle but the decompression pressure was maintained for a further 20 seconds inside the chamber after death. A lack of behavioral response by the bird indicated death.

As demonstrated in Examples 3 and 4, the greater the depression created in the chamber, the greater the rarefaction of the air (and therefore greater reduction of oxygen). The stunning and/or slaughter effect of the gas, which further lowers the concentration of oxygen, is thus increased, as demonstrated with the reduction in the slaughter time of the animals in Example 4, as compared to Example 3.

Reducing the cycle times increases the number of stunning and/or slaughter cycles that can be achieved per hour, thus resulting in lower plant costs. In addition, it is possible to reduce the volume of gas used when lower pressures are used (e.g., 180 liters of $CO_2$ in Example 3 vs. 140 liters of $CO_2$ in Example 4), thus further saving on the cost of the gas used.

Example 5

In this example, the slaughter of a chicken using the combination of low atmospheric pressure and a single phase addition of carbon dioxide gas was demonstrated. Unless otherwise indicated, the pressures given in Example 5 are absolute pressure A chicken of average weight (1.8 kg) was placed in the decompression chamber and the pressure was lowered to about 335.7 mbar (about 9.9 inHg) (absolute pressure) in about 66 seconds.

This absolute pressure (335.7 mbar) corresponds to a volume of air of 335.7 liters evenly distributed inside the chamber and in which there is thus a quantity of nitrogen ($N_2$) equal to 78% (corresponding to approximately 262 liters) and a quantity of oxygen ($O_2$) equal to 21% (corresponding to about 70 liters). Therefore, the concentration of evenly distributed oxygen in the chamber (at depression of 335.7 mbar) was equal to 7% of the volume of the chamber (1000 liters).

Carbon dioxide gas was then introduced into the chamber in an amount of 40% of the volume of air in the chamber (335.7 liters); i.e., corresponding to about 135 liters of carbon dioxide gas. Adding the volume of carbon dioxide gas (135 liters) to the volume of residual air present in the chamber (335.7 liters) gives a total volume of the mixture (air+gas) of about 470 liters, which corresponds to an absolute pressure of 470 mbar (about 13.87 inHg). Thus, the pressure in the chamber after addition of the carbon dioxide was 470 mbar, which was greater than the initial decompression pressure (335.7 mbar).

The concentration of oxygen evenly distributed in the chamber (in depression) after the introduction of the carbon dioxide gas fell to 5% of the volume of the chamber itself. The oxygen concentration was determined according to the following equation: volume of air remaining (335.7 liters)/volume of mixture (470 liters)×7% oxygen=5%.

Thus, with the addition of 135 liters of carbon dioxide gas, the concentration of oxygen in the chamber fell from the initial 7% from the depression alone to 5% following the introduction of the carbon dioxide gas (40% volume of $CO_2$).

The decompression pressure was maintained until the cycle time (total residence time of the bird in the chamber) reached 3 minutes and 30 seconds. The bird was found dead 3 minutes after the start of the cycle, but the decompression pressure was maintained for a further 30 seconds inside the chamber after death. A lack of behavioral response by the bird indicated death.

This example demonstrates that the low oxygen and low pressure reached are suitable for the well-being of the animals which reach the state of anoxia quickly and without trauma.

Example 6

The general procedure set forth in Examples 3 and 4 was repeated using the decompression pressures set forth in Table 3 below. The results are set forth in Table 3. The total cycle time for each experiment was less than 5 minutes.

TABLE 3

| Gauge pressure | | Absolute Pressure | Volume of air after decomp. | Volume of $O_2$ after decomp. | Volume of $N_2$ after decomp. | % $O_2$ in chamber after decomp. | % $N_2$ in chamber after decomp. | Vol. $CO_2$ added in Phase 1 (40%) | Vol. mixture (air + 40% $CO_2$) | % $O_2$ in chamber after Phase 1 (40% $CO_2$) | Vol. $CO_2$ after Phase 2 (40% + 20%) | Vol. mixture (air + Phase 1 and 2 $CO_2$) | % $O_2$ in chamber after Phase 2 |
|---|---|---|---|---|---|---|---|---|---|---|---|---|---|
| inHg | mbar | mbar | (L) | (L) | (L) | % | % | (L) | (L) | % | (L) | (L) | % |
| 25 | 856.6 | 156.4 | 156.4 | 32.8 | 122.0 | 3.3 | 12.2 | 62.6 | 219.0 | 2.35 | 93.8 | 250.2 | 2.05 |
| 24 | 813.0 | 200.0 | 200.0 | 42.0 | 156.0 | 4.2 | 15.6 | 80.0 | 280.0 | 3.00 | 120.0 | 320.0 | 2.63 |

TABLE 3-continued

| Gauge pressure | | Absolute Pressure | Volume of air after decomp. | Volume of O$_2$ after decomp. | Volume of N$_2$ after decomp. | % O$_2$ in chamber after decomp. | % N$_2$ in chamber after decomp. | Vol. CO$_2$ added in Phase 1 (40%) | Vol. mixture (air + 40% CO$_2$) | % O$_2$ in chamber after Phase 1 (40% CO$_2$) | Vol. CO$_2$ after Phase 2 (40% + 20%) | Vol. mixture (air + Phase 1 and 2 CO$_2$) | % O$_2$ in chamber after Phase 2 |
|---|---|---|---|---|---|---|---|---|---|---|---|---|---|
| inHg | mbar | mbar | (L) | (L) | (L) | % | % | (L) | (L) | % | (L) | (L) | % |
| 23.5 | 795.8 | 217.2 | 217.2 | 45.6 | 169.4 | 4.6 | 16.9 | 86.9 | 304.1 | 3.26 | 130.3 | 347.5 | 2.85 |
| 23 | 778.9 | 234.1 | 234.1 | 49.2 | 182.6 | 4.9 | 18.3 | 93.6 | 327.7 | 3.51 | 140.5 | 374.6 | 3.07 |
| 22.5 | 761.9 | 251.1 | 251.1 | 52.7 | 195.9 | 5.3 | 19.6 | 100.4 | 351.5 | 3.77 | 150.7 | 401.8 | 3.30 |
| 22 | 745.0 | 268.0 | 268.0 | 56.3 | 209.0 | 5.6 | 20.9 | 107.2 | 375.2 | 4.02 | 160.8 | 428.8 | 3.52 |
| 21.6 | 733.0 | 280.0 | 280.0 | 58.8 | 218.4 | 5.9 | 21.8 | 112.0 | 392.0 | 4.20 | 168.0 | 448.0 | 3.68 |
| 21.5 | 728.1 | 284.9 | 284.9 | 59.8 | 222.2 | 6.0 | 22.2 | 114.0 | 398.9 | 4.27 | 170.9 | 455.8 | 3.74 |
| 21 | 711.1 | 301.9 | 301.9 | 63.4 | 235.5 | 6.3 | 23.5 | 120.8 | 422.7 | 4.53 | 181.1 | 483.0 | 3.96 |
| 20.5 | 694.2 | 318.8 | 318.8 | 66.9 | 248.7 | 6.7 | 24.9 | 127.5 | 445.3 | 4.78 | 191.3 | 510.1 | 4.18 |
| 20.2 | 685.3 | 327.7 | 327.7 | 68.8 | 255.6 | 6.9 | 25.6 | 131.1 | 458.8 | 4.92 | 196.6 | 524.3 | 4.30 |
| 20 | 677.3 | 335.7 | 335.7 | 70.5 | 261.8 | 7.0 | 26.2 | 134.3 | 470.0 | 5.04 | 201.4 | 537.1 | 4.41 |
| 19.5 | 660.3 | 352.7 | 352.7 | 74.1 | 275.1 | 7.4 | 27.5 | 141.1 | 493.8 | 5.29 | 211.6 | 564.3 | 4.63 |
| 19 | 643.4 | 369.6 | 369.6 | 77.6 | 288.3 | 7.8 | 28.8 | 147.8 | 517.4 | 5.54 | 221.8 | 591.4 | 4.85 |
| 18.8 | 637.7 | 375.3 | 375.3 | 77.2 | 289.8 | 7.7 | 28.7 | 147.1 | 514.8 | 5.52 | 220.6 | 588.3 | 4.83 |
| 18.5 | 626.5 | 386.5 | 386.5 | 81.2 | 301.5 | 8.1 | 30.1 | 154.6 | 541.1 | 5.80 | 231.9 | 618.4 | 5.07 |
| 18 | 609.6 | 403.4 | 403.4 | 84.7 | 314.7 | 8.5 | 31.5 | 161.4 | 564.8 | 6.05 | 242.0 | 645.4 | 5.29 |
| 17.5 | 592.6 | 420.4 | 420.4 | 88.3 | 327.9 | 8.8 | 32.8 | 168.2 | 588.6 | 6.31 | 252.2 | 672.6 | 5.52 |
| 17.4 | 590.3 | 422.7 | 422.7 | 88.8 | 329.7 | 8.9 | 33.0 | 169.1 | 591.8 | 6.34 | 253.6 | 676.3 | 5.55 |
| 17 | 575.7 | 437.3 | 437.3 | 91.8 | 341.1 | 9.2 | 34.1 | 174.9 | 612.2 | 6.56 | 262.4 | 699.7 | 5.74 |
| 16 | 541.0 | 472.0 | 472.0 | 99.1 | 368.2 | 9.9 | 36.8 | 188.8 | 660.8 | 7.08 | 283.2 | 755.2 | 6.20 |
| 15 | 508.0 | 505.0 | 505.0 | 106.1 | 393.9 | 10.6 | 39.4 | 202.0 | 707.0 | 7.58 | 303.0 | 808.0 | 6.63 |
| 10 | 338.0 | 675.0 | 675.0 | 141.8 | 526.5 | 14.2 | 52.7 | 270.0 | 945.0 | 10.13 | 405.0 | 1080.0 | 8.86 |
| 5 | 169.3 | 843.7 | 843.7 | 177.2 | 658.1 | 17.7 | 65.8 | 337.5 | 1,181.2 | 12.66 | 506.2 | 1349.9 | 11.07 |

Example 7

In this example, pigs are slaughtered using low atmospheric pressure in combination with inert gas.

A pressure chamber is equipped to measure continuously the temperature of the gas, to display and record the gas concentration and the time of animal exposure to gas, and to provide visible and audible warning if the concentration of gas falls below a predetermined level.

The pigs are placed in the decompression chamber, and the entrance door closed. The pigs are subject to low atmospheric pressure treatment, with the target decompression pressure being 23.5 inHg. The time to the various pressures is set forth in Table 4.

TABLE 4

| Pressure (inHg gauge) | Time to pressure (seconds) |
|---|---|
| 5 | 9 |
| 10 | 24 |
| 15 | 43 |
| 20 | 72 |
| 21 | 114 |
| 23.5 | 194 |

Once the target decompression pressure of 23.5 inHg is reached, carbon dioxide is released into the chamber in an amount sufficient to achieve an atmosphere inside the chamber comprising at least 40% carbon dioxide. Optionally, other inert gases (e.g., argon and/or nitrogen) may also be released into the chamber. The decompression pressure is maintained until the animals achieve a state of death.

The method for stunning and/or killing animals according to the present invention, is based on the control of the volume of gas introduced and consequently on the control of the percentage of oxygen in the chamber by control of the pressure inside an airtight chamber in which firstly a depression is created until it reaches certain internal pressure and subsequently the pressure inside the chamber is raised by introducing gas, such as carbon dioxide or other inert gases. Thanks to the direct ratio between the pressure increase and the increase of volume of air inside the airtight chamber the correct percentage of gas to introduce into the airtight chamber can be achieved with considerable accuracy so as to create the right percentage concentration of oxygen in the mixture (rarefied air and gas) which causes the death of the animals by anoxia in a given time.

It should be noted that the system proposed here can be used in all animals and cases provided for by the legislation referred to above.

Innovatively, the method and system for stunning and/or killing animals in a controlled atmosphere according to the present invention, makes it possible to reduce stunning and/or killing times of the animal while respecting all legal criteria required for animal wellbeing.

Advantageously, the method and system for stunning and/or killing animals according to the present invention, makes it possible to precisely control the percentage of air to be extracted, the percentage of residual oxygen in the airtight chamber, and the percentage of gas (carbon dioxide or other inert gases) to introduce.

Advantageously, the method and system for stunning and/or killing animals according to the present invention, makes it possible to control the stunning and/or killing times of birds in that by acting with precision on the oxygen value present after introducing the gas, the stunning and/or killing system can be customized in relation to the size of chickens. For example, with small chickens (of about 1.8 kg live) a 200 mbar depression may be reached quickly, up to a total residence time in the chamber of about 2 minutes. For example, with larger chickens (of about 3.6 kg live) it is appropriate to reach a 200 mbar depression and all the intermediate steps in longer times.

Advantageously, the method and system for stunning and/or killing animals according to the present invention, reduces the costs associated with the use of carbon dioxide or other inert gases and reduces the emissions of $CO_2$ into the atmosphere, compared to a gas stunning system.

Advantageously, the method and system for stunning and/or killing animals according to the present invention, also reduces the energy consumption related to the decompression, since the working pressure inside the chamber is higher than that used in traditional LAPS systems, resulting in greater well-being for the animals, and in the case of smaller birds reduced breaking of the wings.

Advantageously, the method and system according to the present invention, permits programming of the stunning and/or killing cycle controlling the depression created in the chamber (absolute pressure), the quantity of gas to be introduced and the residence times of the animals in the chamber. It is thus possible to manage the killing cycle balancing the needs of animal well-being with cost containment requirements. Consequently, depending on the type of animal and as provided for by applicable law, it is possible to reduce the amount of gas introduced and the stunning and/or killing cycle times by creating a greater depression and greater vacuum inside the chamber, with benefits from the strictly economic point of view or alternatively, it is possible, by increasing the quantity of gas introduced and the stunning and/or killing cycle times, to maintain a lesser depression and a higher absolute pressure inside the chamber, with further advantages from the point of view of animal well-being.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

In view of the above, it will be seen that the several objects of the disclosure are achieved. As various changes could be made in the above-described methods without departing from the scope of the disclosure, it is intended that all matter contained in the above description be interpreted as illustrative and not in a limiting sense.

What is claimed is:

1. A method for slaughtering an animal, the method comprising:
    placing the animal in a chamber;
    sealing the chamber;
    decompressing the chamber to a decompression pressure, the decompression pressure being lower than a normal atmospheric pressure at which the animal is accustomed to living;
    adding a first inert gas to the chamber after the decompression pressure has been reached, wherein the inert gas renders the animal unconscious;
    adding a second inert gas to the chamber after the animal is unconscious; and
    maintaining the decompression pressure until the animal achieves a state of death.

2. The method of claim 1, wherein the first inert gas is selected from the group consisting of carbon dioxide, argon, nitrogen, and combinations thereof, and the amount of the first inert gas added to the chamber is about 5% to about 40% of the volume of air remaining in the chamber after the decompression pressure has been reached.

3. The method of claim 1, wherein the second inert gas is selected from the group consisting of carbon dioxide, argon, nitrogen, and combinations thereof, and the amount of the second inert gas added to the chamber during the second addition is an amount of about 1% to about 40% of the volume of air in the chamber after the decompression pressure has been reached.

4. The method of claim 1, wherein the amount of the second inert gas added to the chamber during the second addition is an amount of at least about 40% of the volume of air in the chamber after the decompression pressure has been reached.

5. The method of claim 1, wherein the animal is selected from the group consisting of pigs, sheep, rabbits, cows, goats, llamas, vicunas, alpacas, horses, chinchillas, mustelids, skunks, and poultry.

6. The method of claim 1, wherein the absolute pressure in the chamber following decompression is about 200 mbar or greater, and does not rise above 845 mbar after addition of the inert gas.

7. The method of claim 1, wherein the overall time of residence of the animal in the chamber is between about 80 seconds and about 600 seconds.

8. A method for humanely slaughtering a non-poultry animal having a diaphragm respiratory system, the method comprising:
    placing the animal in a chamber;
    sealing the chamber;
    decompressing the chamber at a continuous rate to a decompression pressure, the decompression pressure being lower than a normal atmospheric pressure at which the animal is accustomed to living; and
    maintaining the decompression pressure until the animal achieves a state of death;
    wherein pressure in the chamber is reduced to the decompression pressure over a lapse time of between about 4 minutes and about 8 minutes.

9. The method of claim 1 wherein the chamber is decompressed at a continuous rate and the decompression pressure is from about 21 inHg gauge pressure to about 26 inHg gauge pressure.

10. The method of claim 1, wherein the pressure in the chamber is reduced to the decompression pressure over a lapse time of from about 4 minutes to about 12 minutes.

11. The method of claim 1, wherein a state of death is achieved about 8 to about 16 minutes after the start of decompression.

12. The method of claim 1, wherein the decompression pressure is about 23.5 inHg gauge pressure.

13. The method of claim 1, wherein the lapse time is from about 30 seconds to about 720 seconds, and the decompression pressure is maintained for from about 4 minutes to about 8 minutes.

14. A system (100) for the stunning and/or the slaughtering of meat animals, comprising an airtight chamber (10) provided with at least one opening (11, 12) for the introduction of the live animals and the extraction of the stunned or slaughtered animals, closure devices (13, 14) appropriate to close hermetically said at least one opening (11, 12), means of aspiration (30, 31, 32) communicating with said chamber (10) to remove air therefrom, means (20, 21, 22) for the feeding of at least one gas appropriate to cause the stunning and/or the slaughtering of the animals in the chamber (10) after a preset absolute pressure has been reached therein, a control unit (50) appropriate to control the aspiration means (30, 31, 32) and the means (20, 21, 22) for the feeding of the gas according to the method of stunning and/or slaughtering in accordance with any one of the preceding claims.

15. The system (100) of claim 14, wherein the control unit (50) is provided with a user interface comprising means of setting/resetting appropriate to allow the operator to set the values of absolute pressure to be created in the chamber (10) and the percentage of gas to be fed into the chamber (10) after decompression.

16. The system (100) of claim 15, wherein said setting means are appropriate to allow the operator to set the values of the total time the animals stay in the chamber (10).

17. The system (100) of claim 14, comprising a pressure probe appropriate to detect the effective pressure inside the chamber (10), and wherein the control unit (50) controls the means (20, 21, 22) for the feeding of the gas on the basis of the pressure values detected by the probe.

18. The system (100) of claim 14, wherein the aspiration means comprise a pump (30) connected to the chamber (10) via at least one conduit (31) whereto a first shut-off valve (32) is associated for the opening and the closure of the conduit (31), and the means for the feeding of at least one gas comprise at least one tank (20) containing the gas to be fed connected to the chamber (10) by means of at least one conduit (21) whereto a second shut-off valve (22) is associated for the opening and the closure of the conduit (21).

19. The system (100) of claim 14, comprising a hydraulic system (40), connected via a bypass conduit (31') to the aspiration means (30), comprising a plurality of pipes (41, 41', 41") of different diameter, wherein each pipe is provided with a valve (42, 42', 42") of the on-off type.

* * * * *